US010013934B2

(12) United States Patent
Kim et al.

(10) Patent No.: US 10,013,934 B2
(45) Date of Patent: Jul. 3, 2018

(54) METHOD OF DRIVING LIGHT SOURCE, LIGHT SOURCE APPARATUS AND DISPLAY APPARATUS HAVING THE LIGHT SOURCE APPARATUS

(71) Applicant: SAMSUNG DISPLAY CO., LTD., Yongin, Gyeonggi-do (KR)

(72) Inventors: Heen-Dol Kim, Yongin-si (KR); Jai-Hyun Koh, Hwaseong-si (KR); Hyun-Kyu Namkung, Seoul (KR); Kuk-Hwan Ahn, Hwaseong-si (KR); Nam-Jae Lim, Gwacheon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 722 days.

(21) Appl. No.: 14/541,881

(22) Filed: Nov. 14, 2014

(65) Prior Publication Data

US 2015/0348479 A1 Dec. 3, 2015

(30) Foreign Application Priority Data

Jun. 2, 2014 (KR) ........................ 10-2014-0066967

(51) Int. Cl.
*G06F 3/038* (2013.01)
*G09G 3/36* (2006.01)
*G09G 3/34* (2006.01)

(52) U.S. Cl.
CPC ......... *G09G 3/3611* (2013.01); *G09G 3/3406* (2013.01); *G09G 2230/00* (2013.01); *G09G 2310/0259* (2013.01); *G09G 2310/08* (2013.01); *G09G 2320/02* (2013.01)

(58) Field of Classification Search
CPC ............. G09G 2230/00; G09G 3/3406; G09G 2320/02; G09G 3/3611
USPC ..................................................... 345/99, 204
See application file for complete search history.

(56) References Cited

U.S. PATENT DOCUMENTS

| | | | | |
|---|---|---|---|---|
| 8,139,021 B2 | 3/2012 | Botzas et al. | | |
| 2009/0284457 A1* | 11/2009 | Botzas ................ | G09G 3/3406 345/102 | |
| 2009/0303216 A1* | 12/2009 | Shin ..................... | G09G 3/3406 345/207 | |
| 2010/0245310 A1* | 9/2010 | Hashimoto .......... | G09G 3/3406 345/207 | |
| 2011/0298839 A1* | 12/2011 | Nakanishi ............ | G09G 3/3426 345/690 | |
| 2012/0086713 A1* | 4/2012 | Cho ....................... | G09G 3/003 345/419 | |

FOREIGN PATENT DOCUMENTS

| | | |
|---|---|---|
| JP | 2006-323418 | 11/2006 |
| KR | 1020070092533 | 9/2007 |
| KR | 1020120067709 | 6/2012 |

* cited by examiner

*Primary Examiner* — Jonathan Blancha
(74) *Attorney, Agent, or Firm* — F. Chau & Associates, LLC

(57) ABSTRACT

A method of driving a light source includes outputting a light source driving signal and outputting a delayed driving signal. The light source driving signal drives a light source based on image data. The delayed driving signal is generated by delaying the light source driving signal based on a vertical sync signal having a frame period of the image data and a data enable signal having a horizontal line period of the image data.

20 Claims, 5 Drawing Sheets

METHOD OF DRIVING LIGHT SOURCE, LIGHT SOURCE APPARATUS AND DISPLAY APPARATUS HAVING THE LIGHT SOURCE APPARATUS

CROSS-REFERENCE TO RELATED APPLICATIONS

This application claims priority under 35 U.S.C. § 119 to Korean Patent Application No. 10-2014-0066967, filed on Jun. 2, 2014, the disclosure of which is incorporated by reference herein in its entirety.

TECHNICAL FIELD

Exemplary embodiments of the present invention relate to a method of driving a light source, a light source apparatus for performing the method, and a display apparatus including the light source apparatus. More particularly, exemplary embodiments relate to a method of driving a light source that is used for a display apparatus displaying an image, a light source apparatus for performing the method, and a display apparatus including the light source apparatus.

DISCUSSION OF THE RELATED ART

A liquid crystal display apparatus includes a display panel and a light source part.

The display panel includes a lower substrate, an upper substrate and a liquid crystal layer disposed between the upper and lower substrates. The lower substrate may include a pixel electrode, and the upper substrate may include a common electrode. The liquid crystal layer includes liquid crystal molecules. Alignment of the liquid crystal molecules is changed by a pixel voltage applied to the pixel electrode and a common voltage applied to the common electrode.

The light source part provides the display panel with light.

When the display apparatus displays an image, blinking may appear on the display panel due to a panel data signal transmitted to the display panel for displaying the image and a light signal corresponding to light emitted by the light source part not being synchronized with each other. As a result, the display quality of the display apparatus may be deteriorated.

SUMMARY

Exemplary embodiments of the present invention provide a method for driving a light source, which is capable of improving display quality. Exemplary embodiments further provide a light source apparatus for performing the method, and a display apparatus including the light source apparatus.

According to an exemplary embodiment, a method of driving a light source includes outputting a light source driving signal and outputting a delayed driving signal. The light source driving signal drives a light source based on image data. The delayed driving signal is generated by delaying the light source driving signal based on a vertical sync signal having a frame period of the image data and a data enable signal having a horizontal line period of the image data.

In an exemplary embodiment, the light source driving signal is delayed based on the vertical sync signal to output a frame-delayed driving signal. The frame-delayed driving signal is delayed based on the data enable signal to output a line-delayed driving signal.

In an exemplary embodiment, the frame-delayed driving signal is output in response to receiving a frame-delaying selection signal.

In an exemplary embodiment, the line-delayed driving signal is output in response to receiving a line-delaying selection signal.

In an exemplary embodiment, a slope is applied to the delayed driving signal in response to the delayed driving signal changing from a first level to a second level different from the first level.

In an exemplary embodiment, applying the slope to the delayed driving signal is based on a vertical resolution signal in response to receiving a slope selection signal.

In an exemplary embodiment, the delayed driving signal is changed from the first level to the second level through A steps, where A is an integer greater than or equal to 2.

In an exemplary embodiment, A is $2^n$ in and n is a natural number.

In an exemplary embodiment, the delayed driving signal is changed A times based on a quotient obtained by dividing a level difference between the first level and the second level by A.

In an exemplary embodiment, when dividing the level difference by A results in a remainder, one is added to the quotient according to the number of the remainder.

In an exemplary embodiment, the delayed driving signal is synchronized with a panel data signal output by a display panel configured to display an image based on the image data.

According to an exemplary embodiment, a light source apparatus includes a light source configured to generate light, a light source driver configured to output a light source driving signal to drive a light source based on image data, and a delaying part configured to output a delayed driving signal by delaying the light source driving signal based on a vertical sync signal having a frame period of the image data and a data enable signal having a horizontal line period of the image data.

In an exemplary embodiment, the delaying part includes a frame delaying part configured to output a frame-delayed driving signal based on the vertical sync signal, and a line delaying part configured to delay the frame-delayed driving signal based on the data enable signal to output a line-delayed driving signal.

In an exemplary embodiment, the frame delaying part is configured to receive a frame-delaying selection signal and output the frame-delayed driving signal in response to receiving the frame-delaying selection signal.

In an exemplary embodiment, the line delaying part is configured to receive a line-delaying selection signal and output the line-delayed driving signal in response to receiving the line-delaying selection signal.

In an exemplary embodiment, the line delaying part includes a line counter configured to count a number of times the data enable signal is activated.

In an exemplary embodiment, the light source apparatus further includes a sloping part configured to apply a slope to the delayed driving signal in response to the delayed driving signal changing from a first level to a second level different from the first level.

According to an exemplary embodiment, a display apparatus includes a display panel configured to display an image based on image data and a light source apparatus. The light source apparatus includes a light source part configured to provide the display panel with light, a light source driver configured to output a light source driving signal to drive the light source part based on the image data, and a delaying part configured to output a delayed driving signal by delaying the light source driving signal based on a vertical sync signal having a frame period of the image data and a data enable signal having a horizontal line period of the image data.

In an exemplary embodiment, the light source apparatus further includes a sloping part configured to apply a slope to the delayed driving signal in response to the delayed driving signal changing from a first level to a second level different from the first level.

According to an exemplary embodiment, a light source apparatus includes a light source part configured to generate light, a light source driver configured to receive image data and output a light source driving signal, and a synchronization part. The synchronization part includes a frame delaying part configured to receive the light source driving signal from the light source driver, and output a frame-delayed driving signal based on a vertical sync signal having a frame period of the image data, a line delaying part configured to receive the frame-delayed driving signal from the frame delaying part, delay the frame-delayed driving signal based on a data enable signal having a horizontal line period of the image data, and output a line-delayed driving signal, and a sloping part configured to receive the line-delayed driving signal from the line delaying part, and apply a slope to the line-delayed driving signal to generate a sloping data signal. The light source part is driven using the sloping data signal.

According to exemplary embodiments, a synchronization part delays a light source driving signal and provides the light source driving signal with a slope to output a synchronized light source driving signal synchronized with a panel data signal. Thus, blinking of an image due to a light signal and the panel data signal not being synchronized with each other may be reduced. Therefore, display quality of a display apparatus may be improved.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
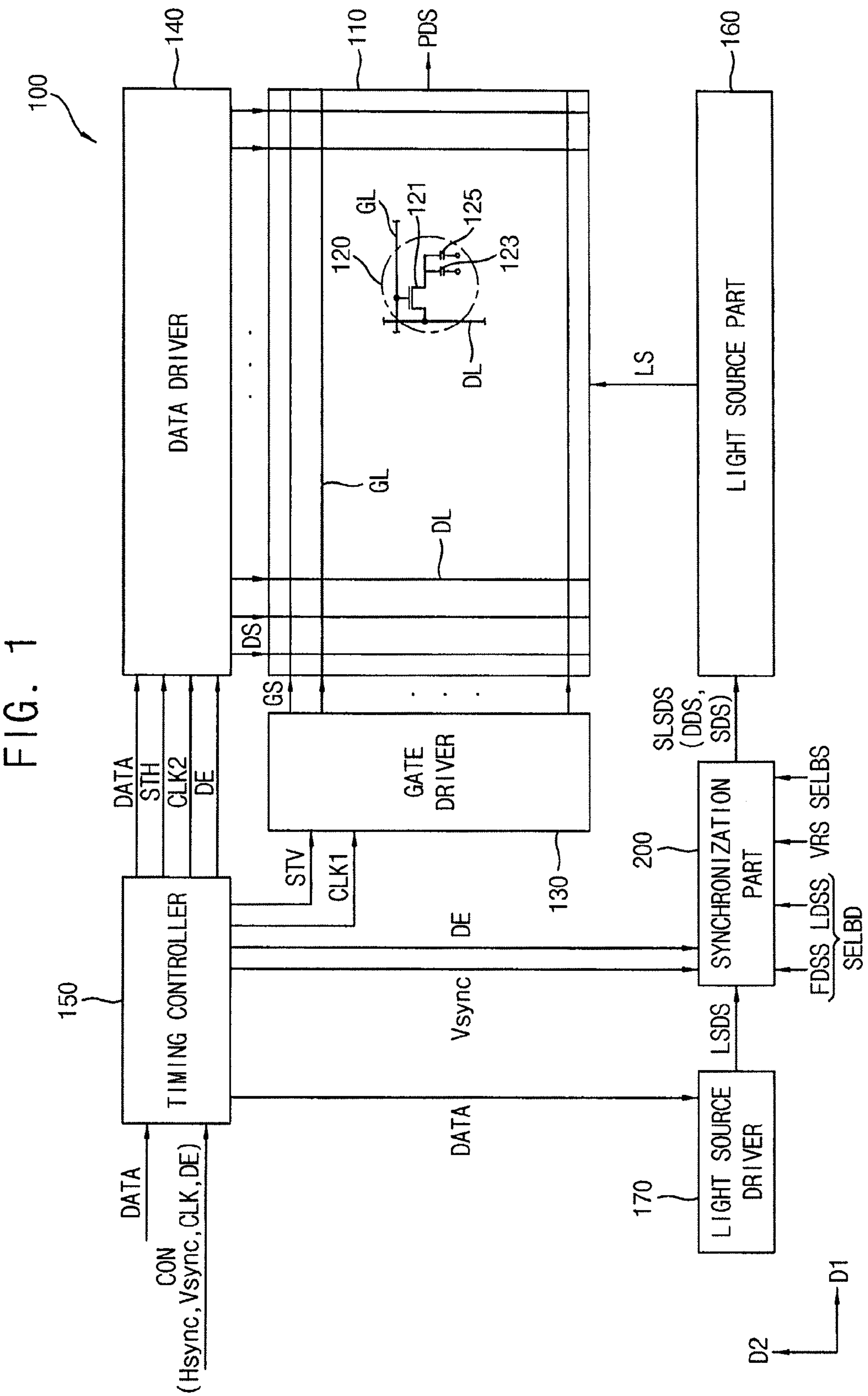
FIG. 1 is a block diagram showing a display apparatus according to an exemplary embodiment of the present invention.

Exemplary embodiments of the present invention will be described more fully hereinafter with reference to the accompanying drawings, in which various exemplary embodiments are shown. Like reference numerals may refer to like elements throughout the drawings.

Herein, when two or more elements or values are described as being substantially the same as each other, it is to be understood that the elements or values are identical to each other, indistinguishable from each other, or distinguishable from each other but functionally the same as each other as would be understood by a person having ordinary skill in the art.

FIG. 1 is a block diagram showing a display apparatus according to an exemplary embodiment of the present invention.

Referring to FIG. 1, a display apparatus 100 includes a display panel 110, a gate driver 130, a data driver 140, a timing controller 150, a light source part 160, a light source driver 170 and a synchronization part 200. The light source driver 170 and the synchronization part 200 may be collectively referred to herein as a light source driving apparatus that drives the light source part 160. The light source part 160, the light source driver 170 and the synchronization part 200 may be collectively referred to herein as a light source apparatus.

The display panel 110 receives a data signal DS based on image data DATA provided by the timing controller 150 to display an image. For example, according to exemplary embodiments, the image data DATA may include two-dimensional (2D) image data for displaying a 2D image and/or three-dimensional (3D) image data including, for example, left-eye image data and right-eye image data for displaying a 3D image. The image displayed by the display panel 110 may be referred to herein as a panel data signal PDS.

The display panel 110 includes a plurality of gate lines GL, a plurality of data lines DL, and a plurality of pixels 120. The gate lines GL extend in a first direction D1, and the data lines DL extend in a second direction D2 substantially perpendicular to the first direction D1. Each of the pixels 120 includes a thin film transistor 121 electrically connected to a corresponding gate line GL and data line DL, and includes a liquid crystal capacitor 123 and a storage capacitor 125, which are connected to the thin film transistor 121. In an exemplary embodiment, the display panel 110 is a liquid crystal display panel, and the display apparatus 100 is a liquid crystal display apparatus.

The gate driver 130 generates a gate signal GS in response to receiving a gate start signal STV and a gate clock signal CLK1, which are provided by the timing controller 150, and outputs the gate signal GS to the gate lines GL.

The data driver 140 generates a data signal DS in response to receiving a data start signal STH, a data enable signal DE and a data clock signal CLK2, which are provided by the timing controller 150, and outputs the data signal DS to the data lines DL.

In an exemplary embodiment, the timing controller 150 receives the image data DATA and a control signal CON from an external device (e.g., a device located external to the display apparatus 100). The control signal CON may include, for example, a horizontal sync signal Hsync, a vertical sync signal Vsync, a clock signal CLK and the data enable signal DE. The timing controller 150 generates the data start signal STH using the horizontal sync signal Hsync, and outputs the data start signal STH to the data driver 140. The timing controller 150 generates the gate start signal STV using the vertical sync signal Vsync, and outputs the gate start signal STV to the gate driver 130. The timing controller 150 generates the gate clock signal CLK1 and the data clock signal CLK2 using the clock signal CLK, and outputs the gate clock signal CLK1 and the data clock signal CLK2 to the gate driver 130 and the data driver 140, respectively. The timing controller 150 outputs the data enable signal DE to the data driver 140. The timing controller 150 outputs the image data DATA to the light source driver 170. The timing controller 150 outputs the vertical sync signal Vsync and the data enable signal DE to the synchronization part 200.

The light source part 160 provides light having a light signal LS to the display panel 110. The light source part 160 includes a light source that generates the light signal LS. For example, the light source may be a light emitting diode (LED).

The light source driver 170 outputs a light source driving signal LSDS for driving the light source part 160 based on the image data DATA provided by the timing controller 150. For example, the light source driving signal LSDS may be a pulse width modulation (PWM) signal. According to exemplary embodiments, as a gray scale of the image data DATA increases, a level of the light source driving signal LSDS may increase, or a pulse width of the light source driving signal LSDS may increase.

The synchronization part 200 delays the light source driving signal LSDS and provides the light source driving signal LSDS with a slope to output a synchronized light source driving signal SLSDS to the light source part 160. That is, a slope may be applied to the light source driving signal LSDS to output the synchronized light source driving signal SLSDS. The synchronization part 200 may delay the light source driving signal LSDS based on the vertical sync signal Vsync and the data enable signal DE in response to receiving a delaying selection signal SELBD, which may be provided by an external source, to output a delayed driving signal DDS. That is, the delayed driving signal DDS may be generated by delaying the light source driving signal LSDS based on the vertical sync signal Vsync, which has a frame period of the image data DATA, and the data enable signal DE, which has a horizontal line period of the image data DATA. Further, the synchronization part 200 may provide the light source driving signal LSDS with a slope based on a vertical resolution signal VRS in response to receiving a slope selection signal SELBS, which may be provided by an external source, to output a sloping driving signal SDS.

The panel data signal PDS provided by the display panel 110 may have a delay time and a slope different from the data signal DS due to, for example, a response speed of a liquid crystal layer in the display panel 110. The sloped light source driving signal SLSDS delays the light source driving signal LSDS, and a slope is applied to the light source driving signal LSDS. Thus, the sloped light source driving signal SLSDS may be a synchronized signal with the panel data signal PDS.

Figure 2:
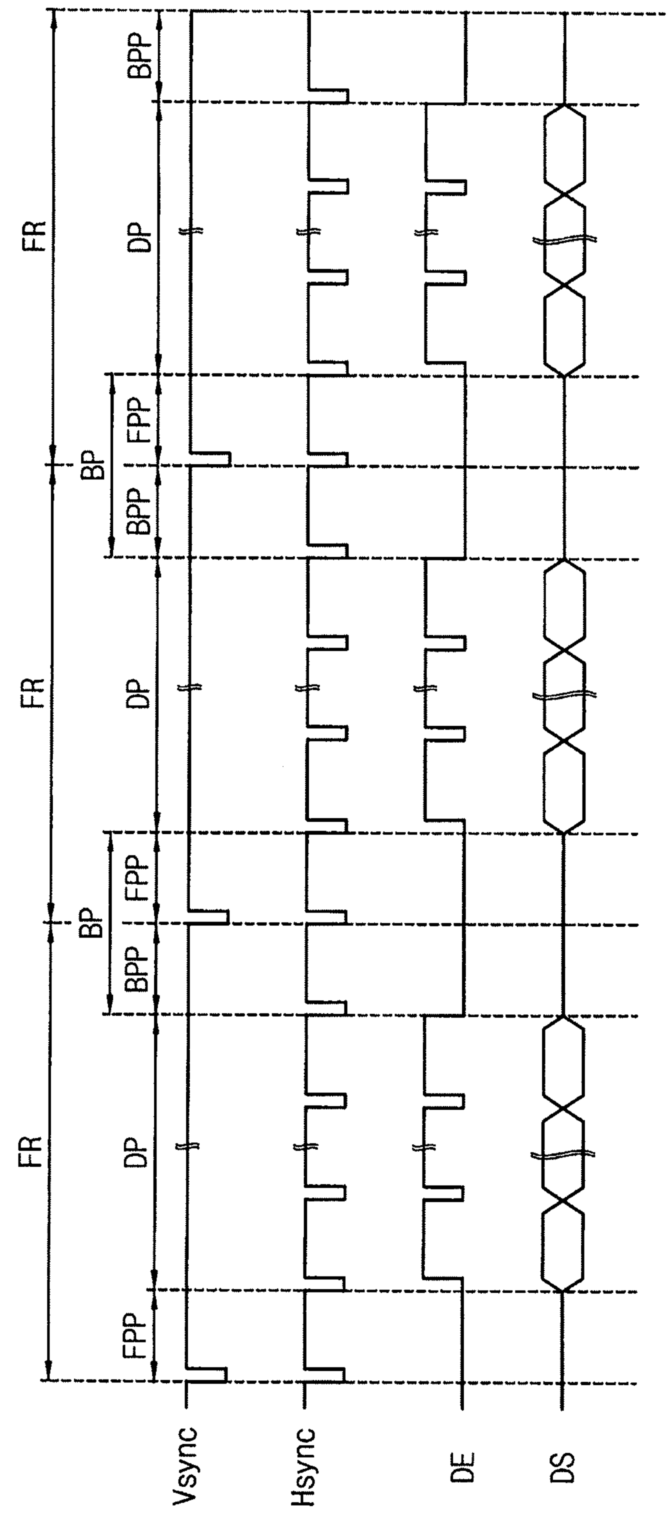
FIG. 2 is a timing diagram illustrating the vertical sync signal, the horizontal sync signal, the data enable signal and the data signal of FIG. 1 according to an exemplary embodiment of the present invention.

FIG. 2 is a timing diagram illustrating the vertical sync signal Vsync, the horizontal sync signal Hsync, the data enable signal DE and the data signal DS of FIG. 1 according to an exemplary embodiment of the present invention.

Referring to FIGS. 1 and 2, a frame FR includes a display period DP during which the display panel 110 displays an image, and a blank period BP during which the display panel 110 does not display an image. The blank period BP is interposed between display periods DP. The blank period BP includes a front porch period FPP and a back porch period BPP. The front porch period FPP is between a starting point of the frame FR and a starting point of the display period DP. The back porch period BPP is between an end point of the frame FR and an end point of the display period DP.

In an exemplary embodiment, the vertical sync signal Vsync defines the frame FR. Thus, the vertical sync signal Vsync has a frame period of the image data DATA.

The horizontal sync signal Hsync defines a horizontal line period during which the data signal DS is output from the data driver 140. Thus, the horizontal sync signal Hsync has a horizontal line period of the image data DATA.

The data enable signal DE defines the display period DP and the blank period BP in the frame FR. In addition, the data enable signal DE defines the horizontal line period during which the data signal DS is output from the data driver 140. Thus, the data enable signal DE has the horizontal line period of the image data DATA.

The data signal DS is provided to the display panel 110 during the display period DP in response to the horizontal sync signal Hsync and the data enable signal DE.

Figure 3:
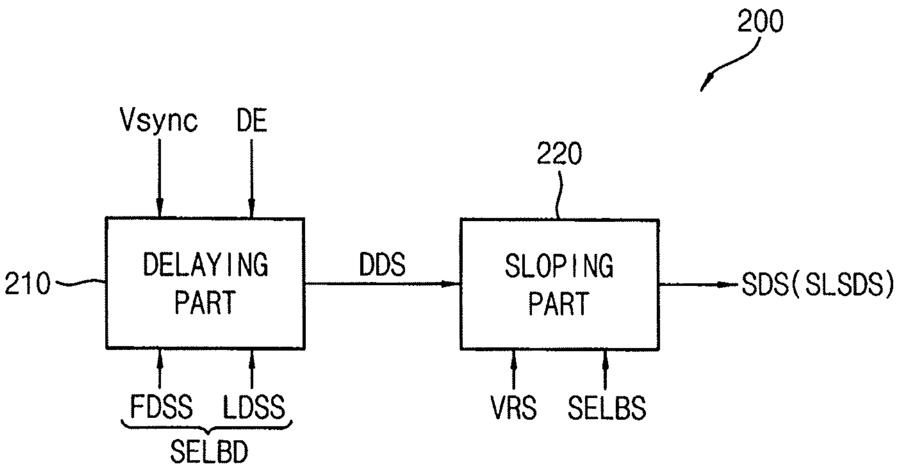
FIG. 3 is a block diagram illustrating the synchronization part of FIG. 1 according to an exemplary embodiment of the present invention.
Figure 4:
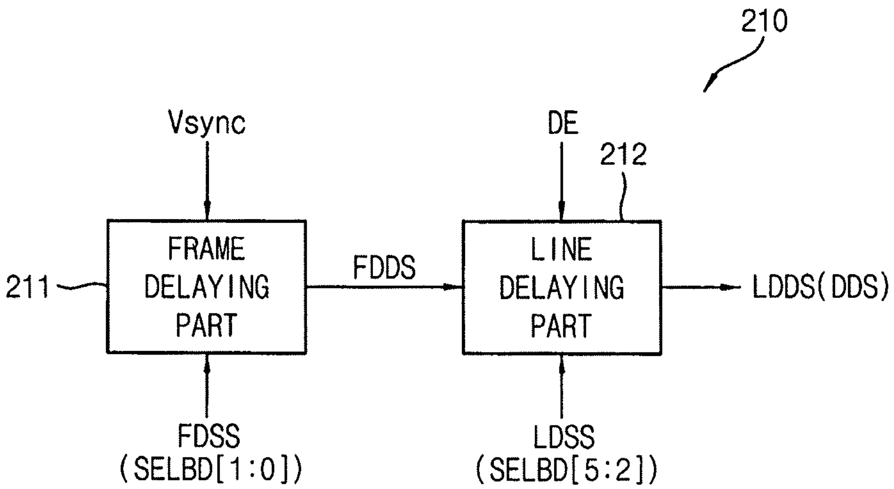
FIG. 4 is a block diagram illustrating the delaying part of FIG. 3 according to an exemplary embodiment of the present invention.

FIG. 3 is a block diagram illustrating the synchronization part 200 of FIG. 1 according to an exemplary embodiment of the present invention. FIG. 4 is a block diagram illustrating the delaying part 210 of FIG. 3 according to an exemplary embodiment of the present invention.

Referring to FIGS. 1 to 4, the synchronization part 200 includes the delaying part 210 and a sloping part 220.

The delaying part 210 delays the light source driving signal LSDS based on the vertical sync signal Vsync and the horizontal sync signal Hsync in response to the delaying selection signal SELBD to output the delayed driving signal DDS. The delaying selection signal SELBD includes, for example, a frame-delaying selection signal FDSS and a line delaying selection signal LDSS. In an exemplary embodiment, when the delaying selection signal SELBD has six bits, SELBD[1:0], which are the two lowest bits of the delaying selection signal SELBD, may correspond to the frame-delaying selection signal FDSS, and SELBD[5:2], which are the four highest bits of the delaying selection signal SELBD, may correspond to the line-delaying selection signal LDSS. Although exemplary embodiments described herein refer to this configuration, exemplary embodiments are not limited thereto. For example, the delaying selection signal SELBD may have a different number of bits, and the bits corresponding to the frame-delaying selection signal FDSS and the line-delaying selection signal LDSS are not respectively limited to the two lowest bits and the four highest bits of the delaying selection signal SELBD.

As shown in FIG. 4, in an exemplary embodiment, the delaying part 210 includes, for example, a frame delaying part 211 and a line delaying part 212.

The frame delaying part 211 delays the light source driving signal LSDS in response to receiving the frame-delaying selection signal FDSS, and outputs a frame-delayed driving signal FDDS. The delay provided by the frame delaying part 211 is an N frame period delay based on the vertical sync signal Vsync, which has the frame period of the image data DATA. N is an integer greater than or equal to 0. When N is 0, the frame-delayed driving signal FDDS may be substantially the same as the light source driving signal LSDS.

For example, when a value of SELBD[1:0] is 0, the frame delaying part 211 may not delay the light source driving signal LSDS, when a value of SELBD[1:0] is 1, the frame delaying part 211 may delay the light source driving signal LSDS by one frame period, when a value of SELBD[1:0] is 2, the frame delaying part 211 may delay the light source driving signal LSDS by two frame periods, and when a value of SELBD[1:0] is 3, the frame delaying part 211 may delay the light source driving signal LSDS by three frame periods.

The line delaying part 212 delays the frame-delayed driving signal FDDS in response to receiving the line-delaying selection signal LDSS, and outputs a line-delayed driving signal LDDS. The delay provided by the line delaying part 212 is an M line period delay based on the data enable signal DE, which has the horizontal line period. M is an integer greater than or equal to 0. When M is 0, the line-delayed driving signal LDDS may be substantially the same as the frame-delayed driving signal FDDS.

For example, when a value of SELBD[5:2] is 0, the line delaying part 212 may not delay the frame-delayed driving signal FDDS, when a value of SELBD[5:2] is 1, the line delaying part 212 may delay the frame-delayed driving signal FDDS by one line period, when a value of SELBD [5:2] is 2, the line delaying part 212 may delay the frame-delayed driving signal FDDS by 256 line periods, when a value of SELBD[5:2] is 3, the line delaying part 212 may delay the frame-delayed driving signal FDDS by 512 line periods, when a value of SELBD[5:2] is 4, the line delaying part 212 may delay the frame-delayed driving signal FDDS by 768 line periods, when a value of SELBD[5:2] is 5, the line delaying part 212 may delay the frame-delayed driving signal FDDS by 1024 line periods, when a value of SELBD [5:2] is 6, the line delaying part 212 may delay the frame-delayed driving signal FDDS by 1280 line periods, when a value of SELBD[5:2] is 7, the line delaying part 212 may delay the frame-delayed driving signal FDDS by 1536 line periods, when a value of SELBD[5:2] is 8, the line delaying part 212 may delay the frame-delayed driving signal FDDS by 1792 line periods, when a value of SELBD[5:2] is 9, the line delaying part 212 may delay the frame-delayed driving signal FDDS by 2048 line periods, when a value of SELBD [5:2] is 10, the line delaying part 212 may delay the frame-delayed driving signal FDDS by 2304 line periods, and when a value of SELBD[5:2] is 11, the line delaying part 212 may delay the frame-delayed driving signal FDDS by 2560 line periods.

In an exemplary embodiment, the line delaying part 212 may include a line counter configured to count activation of the data enable signal DE (e.g., count the number of times the data enable signal DE is activated).

Referring again to FIG. 3, the sloping part 220 provides the delayed driving signal DDS with a slope based on the vertical resolution signal VRS in response to receiving the slope selection signal SELBS, and outputs a sloping data signal SDS. That is, the sloping part 220 applies a slope to the delayed driving signal DDS based on the vertical resolution signal VRS when the slope selection signal SELBS is received, and outputs a sloping data signal SDS. Thus, the sloping part 220 outputs the sloped light source driving signal SLSDS.

For example, the sloping part 220 provides the delayed driving signal DDS with a slope when the delayed driving signal DDS changes from a first level to a second level different from the first level. That is, the sloping part 220 applies a slope to the delayed driving signal DDS in response to the delayed driving signal DDS changing from a first level to a second level different from the first level. Thus, the delayed driving signal DDS may change gradually from the first level to the second level.

In an exemplary embodiment, the sloping part 220 changes the delayed driving signal DDS from the first level to the second level through A steps, where A is an integer greater than or equal to 2. Thus, the sloping part 220 may change the delayed driving signal DDS A times using a quotient obtained by dividing a level difference between the first level and the second level by A. A may be $2^n$, where n is a natural number. When the division results in a remainder, one is added to the quotient the same number of times as the number of the remainder. When the quotient and the remainder are represented by data having bits, the quotient may be represented by the most significant bit (MSB) value, and the remainder may be represented by the least significant bit (LSB) value. When the MSB value is added A times, the sloping part 220 adds 1 bit to the MSB value a number of times corresponding to the LSB value.

A is determined by the slope selection signal SELBS. For example, when a value of the slope selection signal SELBS is 0, A may be 2, when a value of the slope selection signal SELBS is 1, A may be 4, when a value of the slope selection signal SELBS is 2, A may be 8, and when a value of the slope selection signal SELBS is 3, A may be 16.

The sloping part 220 provides the delayed driving signal DDS with a slope based on the vertical resolution signal VRS representing the number of the gate lines GL. For example, when A is 16, the slope may be applied to the delayed driving signal DDS for horizontal line periods of the number of the gate lines GL, which is multiplied by (3/64). Thus, the delayed driving signal DDS may be changed from the first level to the second level for horizontal line periods of the number of the gate lines GL, which is multiplied by (3/64). Thus, the delayed driving signal DDS may change for about 75% of one frame.

Figure 5:
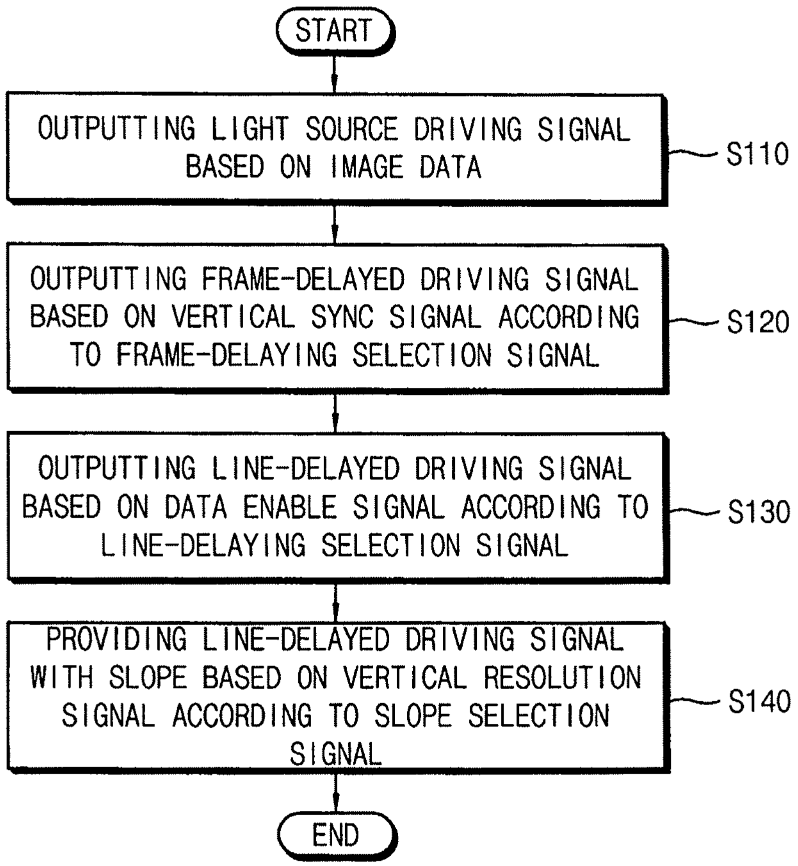
FIG. 5 is a flow diagram illustrating a method of driving a light source performed by the light source driving apparatus illustrated in FIG. 1 according to an exemplary embodiment of the present invention.

FIG. 5 is a flow diagram illustrating a method of driving a light source performed by the light source driving apparatus illustrated in FIG. 1 according to an exemplary embodiment of the present invention.

Referring to FIGS. 1 to 5, the light source driving signal LSDS is output based on the image data DATA at operation S110. For example, the light source driver 170 outputs the light source driving signal LSDS for driving the light source part 160 based on the image data DATA provided by the timing controller 150.

The frame-delayed driving signal FDDS is output based on the vertical sync signal Vsync in response to the frame-delaying selection signal FDSS at operation S120. For example, the frame delaying part 211 of the delaying part 210 of the synchronization part 200 provides the light source driving signal LSDS with N frames period delay based on the vertical sync signal Vsync having the frame period of the image data DATA in response to the frame-delaying selection signal FDSS to output the frame-delayed driving signal FDDS.

The line-delayed driving signal LDDS is output based on the data enable signal DE in response to the line-delaying selection signal LDSS at operation S130. For example, the line delaying part 212 of the delaying part 210 of the synchronization part 200 provides the frame-delayed driving signal FDDS with M lines period delay based on the data enable signal DE having the horizontal line period in response to the line-delaying selection signal LDSS to output the line-delayed driving signal LDDS.

A slope is provided to the line-delayed driving signal LDDS based on the vertical resolution signal VRS in response to the slope selection signal SELBS at operation S140. For example, the sloping part 220 provides the delayed driving signal DDS with a slope based on the vertical resolution signal VRS in response to the slope selection signal SELBS to output the sloping data signal SDS. The sloping part 220 may provide the delayed driving signal DDS with a slope when the delayed driving signal DDS changes from the first level to the second level. Thus, the delayed driving signal DDS may change gradually from the first level to the second level.

The sloping part 220 may change the delayed driving signal DDS from the first level to the second level through A steps, where A is an integer greater than or equal to 2. Thus, the sloping part 220 may change the delayed driving signal DDS A times using a quotient obtained by dividing a level difference between the first level and the second level by A. A may be $2^n$, where n is a natural number. When the division results in a remainder, one is added to the quotient the same number of times as the number of the remainder.

A is determined by the slope selection signal SELBS. For example, when a value of the slope selection signal SELBS is 0, A may be 2, when a value of the slope selection signal SELBS is 1, A may be 4, when a value of the slope selection signal SELBS is 2, A may be 8, and when a value of the slope selection signal SELBS is 3, A may be 16.

The sloping part 220 provides the delayed driving signal DDS with a slope based on the vertical resolution signal VRS representing the number of the gate lines GL. For example, when A is 16, the slope may be applied to the delayed driving signal DDS for horizontal line periods of the number of the gate lines GL, which is multiplied by ($\frac{3}{64}$). Thus, the delayed driving signal DDS may be changed from the first level to the second level for horizontal line periods of the number of the gate lines GL, which is multiplied by ($\frac{3}{64}$). Thus, the delayed driving signal DDS may be changed during about 75% of one frame.

Thus, the sloped light source driving signal SLSDS generated by delaying the light source driving signal LSDS and providing the light source driving signal LSDS with a slope is output to the light source part 160.

According to exemplary embodiments of the present invention as described above with reference to FIGS. 1 to 5, the synchronization part 200 delays the light source driving signal LSDS and provides the light source driving signal LSDS with a slope to generate the sloped light source driving signal SLSDS synchronized with the panel data signal PDS. The sloped light source driving signal SLSDS is output to the light source part 160. Thus, display properties of the display apparatus 100 may be improved. For example, blinking of an image due to the light signal LS and the panel data signal PDS not being synchronized with each other may be reduced.

Figure 6:
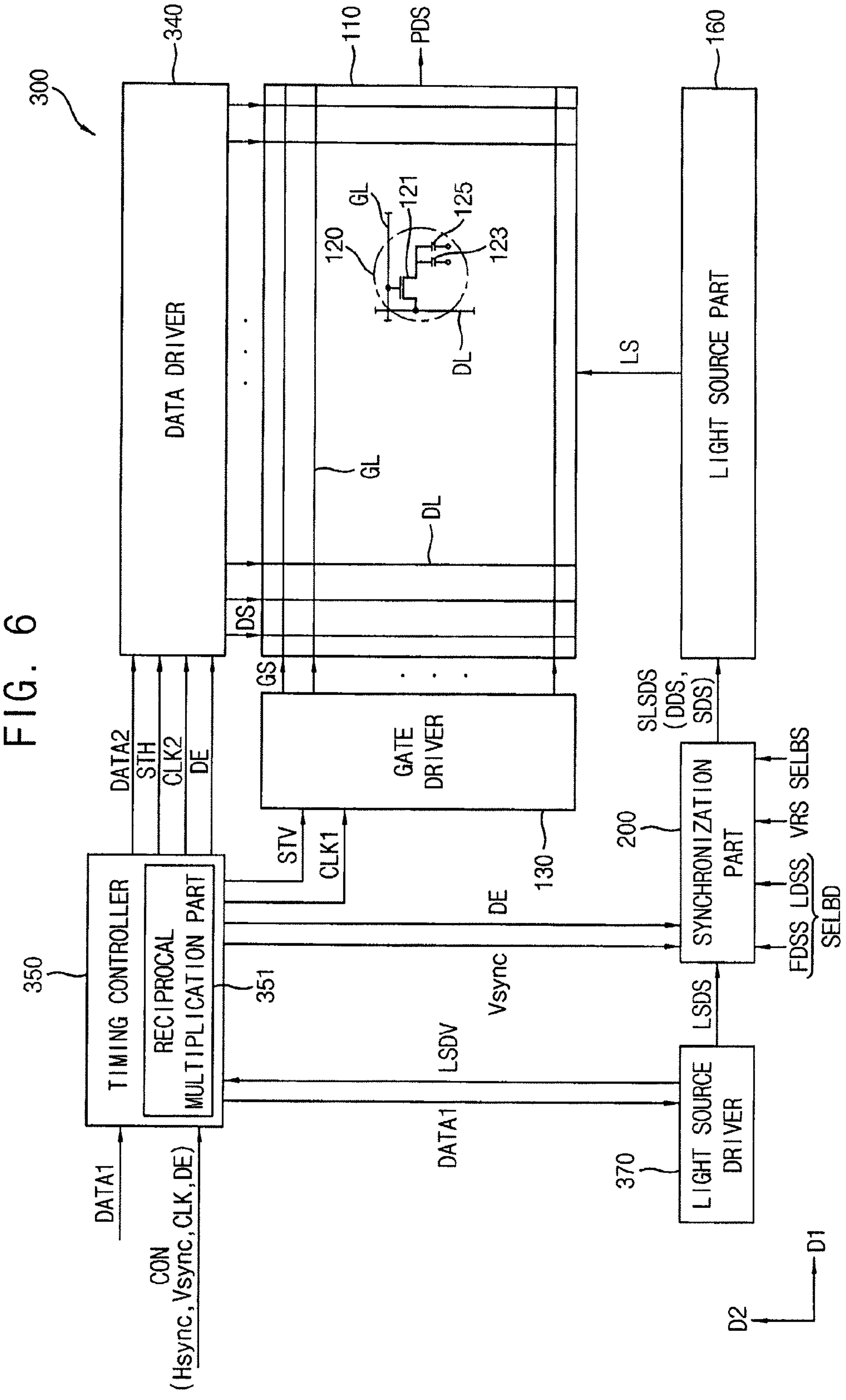
FIG. 6 is a block diagram illustrating a display apparatus according to an exemplary embodiment of the present invention.

FIG. 6 is a block diagram illustrating a display apparatus according to an exemplary embodiment of the present invention.

The display apparatus 300 of FIG. 6 is substantially the same as the display apparatus 100 of FIG. 1, except for certain aspects of a data driver 340, a timing controller 350 and a light source driver 370, as described in further detail below. For convenience of explanation, a description of elements and processes previously described with reference to FIGS. 1 to 5 may be omitted herein.

Referring to FIG. 6, the display apparatus 300 includes a display panel 110, a gate driver 130, a data driver 340, a timing controller 350, a light source part 160, a light source driver 370 and a synchronization part 200. The light source driver 370 and the synchronization part 200 may be collectively referred to herein as a light source driving apparatus that drives the light source part 160. The light source part 160, the light source driver 370 and the synchronization part 200 may be collectively referred to herein as a light source apparatus.

The light source driver 370 outputs a light source driving signal LSDS for driving the light source part 160 based on first image data DATA1 provided by the timing controller 350. For example, the light source driving signal LSDS may be a pulse width modulation (PWM) signal. According to exemplary embodiments, as a gray scale of the first image data DATA1 increases, a level of the light source driving signal LSDS may increase, or a pulse width of the light source driving signal LSDS may increase.

The light source driver 370 provides the timing controller 350 with a light source driving value LSDV corresponding to a level of the light source driving signal LSDS.

In an exemplary embodiment, the timing controller 350 receives the first image data DATA1 and a control signal CON from an external device (e.g., a device located external to the display apparatus 300). The control signal CON may include, for example, the horizontal sync signal Hsync, the vertical sync signal Vsync, the clock signal CLK and the data enable signal DE. The timing controller 350 generates the data start signal STH using the horizontal sync signal Hsync, and outputs the data start signal STH to the data driver 340. The timing controller 350 generates the gate start signal STV using the vertical sync signal Vsync, and outputs the gate start signal STV to the gate driver 130. The timing controller 350 generates the gate clock signal CLK1 and the data clock signal CLK2 using the clock signal CLK, and outputs the gate clock signal CLK1 and the data clock signal CLK2 to the gate driver 130 and the data driver 340, respectively. The timing controller 350 outputs the data enable signal DE to the data driver 340. The timing controller 350 outputs the first image data DATA1 to the light source driver 370. The timing controller 350 outputs the vertical sync signal Vsync and the data enable signal DE to the synchronization part 200.

The timing controller 350 includes a reciprocal multiplication part 351. The reciprocal multiplication part 351 receives the light source driving value LSDV from the light source driver 370, and multiplies the first image data DATA1 by the reciprocal of the light source driving value LSDV to output second image data DATA2 to the data driver 340.

The light source driver 370 may reduce a level of the light source driving signal LSDS to reduce power consumption of the display apparatus 300 for the same gray scales of the first image data DATA1. When the level of the light source driving signal LSDS is reduced, the reciprocal multiplication part 351 of the timing controller 350 multiplies the first image data DATA1 by the reciprocal of the light source driving value LSDV to output the second image data DATA2 to the data driver 340. Thus, even if a brightness of the light signal LS is reduced, a brightness of the panel data signal PDS may be uniform for the first image data DATA1 having the same gray scales.

The data driver 340 outputs a data signal DS based on the second image data DATA2 to the data line DL in response to the data start signal STH, the data enable signal DE, and the data clock signal CLK2, which are provided by the timing controller 350.

A method of driving a light source performed by the light source driving apparatus including the light source driver 370 and the synchronization part 200 of FIG. 6 may be substantially the same as the method of driving a light source described above with reference to FIG. 5.

According to exemplary embodiments of the present invention, the light source driver 370 may reduce a level of the light source driving signal LSDS for the first image data DATA1. Thus, power consumption of the display apparatus 300 may be reduced.

According to exemplary embodiments of the present invention, in a method of driving a light source, a light source driving apparatus for performing the method, and a display apparatus including the light source driving apparatus, a synchronization part delays a light source driving signal and provides the light source driving signal with a slope to output a synchronized light source driving signal synchronized with a panel data signal. Thus, display properties of the display apparatus may be improved. For example, blinking of an image due to a light signal and the panel data signal not being synchronized with each other may be reduced.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of driving a light source, comprising:

outputting a light source driving signal, wherein the light source driving signal drives a light source based on image data; and outputting a delayed driving signal, wherein the delayed driving signal is generated by delaying the light source driving signal based on a first signal having a frame period of the image data and a second signal having a horizontal line period of the image data, wherein outputting the delayed driving signal comprises:

delaying the light source driving signal to output a frame-delayed driving signal; and delaying the frame-delayed driving signal to output a line-delayed driving signal.

2. The method of claim 1, wherein the light source driving signal is delayed based on a vertical sync signal to output the frame-delayed driving signal, and the frame-delayed driving signal is delayed based on a data enable signal to output the line-delayed driving signal.

3. The method of claim 2, wherein the frame-delayed driving signal is output in response to receiving a frame-delaying selection signal.

4. The method of claim 2, wherein the line-delayed driving signal is output in response to receiving a line-delaying selection signal.

5. The method of claim 1, wherein the delayed driving signal is synchronized with a panel data signal output by a display panel configured to display an image based on the image data.

6. A method of driving a light source, comprising:

outputting a light source driving signal, wherein the light source driving signal drives a light source based on image data:

outputting a delayed driving signal, wherein the delayed driving signal is generated by delaying the light source driving signal based on a first signal having a frame period of the image data and a second signal having a horizontal line period of the image data:

applying a slope to the delayed driving signal based on vertical resolution signal.

7. The method of claim 6, wherein the slope is applied to the delayed driving signal in response to the delayed driving signal changing from a first level to a second level different from the first level, and in response to receiving a slope selection signal.

8. The method of claim 7, wherein the delayed driving signal is changed from the first level to the second level through A steps, wherein A is an integer greater than or equal to 2.

9. The method of claim 8, wherein A is $2^n$ and n is a natural number.

10. The method of claim 9, wherein the delayed driving signal is changed A times based on a quotient obtained by dividing a level difference between the first level and the second level by A.

11. The method of claim 10, wherein, when dividing the level difference by A results in a remainder, one is added to the quotient according to a number of the remainder.

12. A light source apparatus, comprising:

a light source part configured to generate light;

a light source driver configured to output a light source driving signal, wherein the light source driving signal drives the light source part based on image data; and a delaying part configured to output a delayed driving signal, wherein the delayed driving signal is generated by delaying the light source driving signal based on a first signal having a frame period of the image data and a second signal having a horizontal line period of the image data, wherein the delaying part comprises:

a frame delaying part configured to output a frame-delayed driving signal; and a line delaying part configured to delay the frame-delayed driving signal to output a line-delayed driving signal.

13. The light source apparatus of claim 12, wherein the frame delaying part is configured to output the frame-delayed driving signal based on a vertical sync signal; and a line delaying part is configured to delay the frame-delayed driving signal based on a data enable signal to output the line-delayed driving signal.

14. The light source apparatus of claim 12, wherein the frame delaying part is configured to receive a frame-delaying selection signal, and output the frame-delayed driving signal in response to receiving the frame-delaying selection signal.

15. The light source apparatus of claim 12, wherein the line delaying part is configured to receive a line-delaying selection signal, and output the line-delayed driving signal in response to receiving the line-delaying selection signal.

16. The light source apparatus of claim 12, wherein the line delaying part comprises a line counter configured to count a number of times the data enable signal is activated.

17. The light source apparatus of claim 12, further comprising:

a sloping part configured to apply a slope to the delayed driving signal in response to the delayed driving signal changing from a first level to a second level different from the first level.

18. A display apparatus, comprising:

a display panel configured to display an image based on image data; and a light source apparatus, comprising:

a light source part configured to provide the display panel with light;

a light source driver configured to output a light source driving signal, wherein the light source driving signal drives the light source part based on the image data; and a delaying part configured to output a delayed driving signal, wherein the delayed driving signal is generated by delaying the light source driving signal based on a first signal having a frame period of the image data and a second signal having a horizontal line period of the image data, wherein the delaying part comprises:

a frame delaying part configured to output a frame-delayed driving signal; and a line delaying part configured to delay the frame-delayed driving signal to output a line-delayed driving signal.

19. The display apparatus of claim 18, wherein the light source apparatus further comprises:

a sloping part configured to apply a slope to the delayed driving signal in response to the delayed driving signal changing from a first level to a second level different from the first level.

20. A light source apparatus, comprising:

a light source part configured to generate light;

a light source driver configured to receive image data and output a light source driving signal; and a synchronization part, comprising:

a frame delaying part configured to receive the light source driving signal from the light source driver, and output a frame-delayed driving signal based on a vertical sync signal having a frame period of the image data;

a line delaying part configured to receive the frame-delayed driving signal from the frame delaying part, delay the frame-delayed driving signal based on a data enable signal having a horizontal line period of the image data, and output a line-delayed driving signal; and a sloping part configured to receive the line-delayed driving signal from the line delaying part, and apply a slope to the line-delayed driving signal to generate a sloping data signal, wherein the light source part is driven using the sloping data signal.

* * * * *